United States Patent
Wilder

(10) Patent No.: US 9,073,794 B2
(45) Date of Patent: Jul. 7, 2015

(54) INCREASING THE GRADE VALUES OF PLANT NUTRIENTS

(71) Applicant: Albee Wilder, Ukiah, CA (US)

(72) Inventor: Albee Wilder, Ukiah, CA (US)

(*) Notice: Subject to any disclaimer, the term of this patent is extended or adjusted under 35 U.S.C. 154(b) by 111 days.

(21) Appl. No.: 13/764,595

(22) Filed: Feb. 11, 2013

(65) Prior Publication Data

US 2014/0223980 A1    Aug. 14, 2014

(51) Int. Cl.
| | |
|---|---|
| *C05G 3/00* | (2006.01) |
| *C05B 3/00* | (2006.01) |
| *C05D 1/00* | (2006.01) |
| *C05D 5/00* | (2006.01) |
| *C05D 9/02* | (2006.01) |
| *C05F 1/00* | (2006.01) |
| *C05F 3/02* | (2006.01) |
| *C05F 11/00* | (2006.01) |

(52) U.S. Cl.
CPC . *C05B 3/00* (2013.01); *C05D 1/005* (2013.01); *C05D 5/00* (2013.01); *C05D 9/02* (2013.01); *C05F 1/002* (2013.01); *C05F 3/02* (2013.01); *C05F 11/00* (2013.01); *C05G 3/0005* (2013.01); *C05G 3/007* (2013.01)

(58) Field of Classification Search
CPC ............ C05B 3/00; C05D 1/005; C05D 5/00; C05D 9/02; C05G 3/005; C05G 3/007; C05F 3/02; C05F 11/00; C05F 1/002
See application file for complete search history.

(56) References Cited

U.S. PATENT DOCUMENTS

| | | | | |
|---|---|---|---|---|
| 4,840,660 A | * | 6/1989 | Kowite et al. | 504/208 |
| 5,002,601 A | * | 3/1991 | Buscall et al. | 71/28 |
| 5,435,822 A | * | 7/1995 | Blouin | 71/33 |
| 2014/0223980 A1 | * | 8/2014 | Wilder | 71/23 |

* cited by examiner

*Primary Examiner* — Jennifer A Smith
(74) *Attorney, Agent, or Firm* — Bay Area Technology Law Group, PC

(57) ABSTRACT

Methods of increasing grade values of plant nutrients and compositions produced from said methods. A plant nutrient is combined with a colloidal micelle, the later having a particle sized between approximately 1 to 500 nm. This mixture is subjected to colloidal milling until it reaches a temperature of at least approximately 65° F. or milling is carried out above atmospheric pressure. In one instance, water is added to the mixture prior to milling, the results of which are spray dried forming a powder having increased plant nutrient values. In a second embodiment, the milled mixture is added to water for application to an agricultural product.

9 Claims, No Drawings

INCREASING THE GRADE VALUES OF PLANT NUTRIENTS

TECHNICAL FIELD

The present invention involves methods of increasing the grade values of a plant nutrient by mixing the plant nutrient with a colloidal micelle with or without the addition of water. The resulting composition can either be formed as a powder or added to water to create a liquid plant nutrient applied to a plant as an aqueous suspension.

BACKGROUND OF THE INVENTION

It is essential to provide plants with nutrients in order to promote plant health, strong yields and disease resistance. Examples of essential plant nutrients including carbon, hydrogen, oxygen, nitrogen, phosphorus, potassium, calcium, magnesium, iron, sulfa, zinc, manganese, copper, boron, molybdenum, nickel and chlorine. Each known nutrient applied in the form of a fertilizer systemically through liquid or dry powder spraying has a grade value known to the agricultural community which enables it to gauge the amounts of nutrients to employ in any particular situation. Underutilizing nutrients will fail to maximize the health and well-being of the agricultural product while overuse can be wasteful and potentially damaging.

Those versed in this field know full well the benefits of various nutrients. For example, nitrogen is a building block of plant proteins. It is an essential part of chlorophyll and a component of amino acids, nucleic acids and coenzymes. Phosphorus is used by plants to form the nucleic acid's DNA and RNA to store and transfer energy. Phosphorus promotes early plant growth and root formation and is essential to flowering and fruiting and the transfer of hereditary traits. Potassium is necessary for translocation of sugars and for starch formation. It is important for the efficient use of water through its role in opening and closing small apertures (stomata) on the surface of leaves. It increases a plant's resistance to disease and assists in enzyme activation and photosynthesis. Calcium provides building blocks for cell walls and membranes and must be present for the formation of new cells. It is a constituent of important plant carbohydrates, such as starch and cellulose. Calcium promotes plant vigor and rigidity and is important to proper root and stem growth. Magnesium is a component of the chlorophyll molecule and is therefore essential for photosynthesis. Sulfur is a constituent of three amino acids (cystine, methionine and cysteine) that play an essential role in protein synthesis. Sulfur is responsible for characteristic odors of plants such as garlic and onion. It is also essential for nodule formation on legumes. Zinc is an essential component of several enzymes in plants. It controls the synthesis of indoleacetic acid and is an important plant growth regulator. It is involved in the production of chlorophyll and protein and is taken up by plants as the zinc ion. Iron is taken up by plants as the ferrous ion and is required for the formation of chlorophyll in plant cells. It serves as an activator for biochemical processes such as the restoration, photosynthesis and symbiotic nitrogen fixation. Manganese is an accelerator for enzymes in plant growth processes and assists iron in chlorophyll formation. Copper is an activator of several enzymes in plants and can play a role in the production of Vitamin A, the deficiency of which interferes with protein synthesis. Boron regulates the metabolism of carbohydrates in plants and is essential for the process by which cells differentiate to form specific tissues. Molybdenum is taken up by plants in the form of molybdate ions which are essential micronutrients that enable plants to make use of nitrogen. Without molybdenum, plants cannot transform nitrate nitrogen to amino acids and legumes cannot fix atmospheric nitrogen. Chlorine is required in photosynthetic reactions. Finally, nickel is a component of the enzyme urease which is needed to prevent toxic accumulation of urea, a product of nitrogen metabolism in plants. The thrust of the present invention is to maximize the nutrient value of these various elements beyond that available by mere application of fertilizers which contain them.

The present invention makes use of colloidal micelles in the nanoparticle size range, generally from 1 to 500 nm. There have been others that have used nanoparticles for agricultural purposes albeit not to increase the value of any plant nutrient. For example, U.S. Pat. No. 6,638,994 teaches an aqueous suspension of an organic active ingredient in the form of a pesticide facilitating the controlled release of the pesticide. The patentee teaches that by controlling the size of a carrier of an active ingredient, namely, a pesticide, one can control the concentration of the active ingredient in a manner that is most environmentally friendly and economical. It is taught by the '994 patent that an aqueous suspension of nanoparticles with a pesticide enables one to design a controlled release of the pesticide.

It is thus an object of the present invention to provide a novel composition and method of producing it which increases the grade value of a plant nutrient beyond the grade value of that nutrient if the present invention was not employed.

These and further objects will be readily apparent when considering the following disclosure and appended claims.

SUMMARY OF THE INVENTION

The present invention involves a method of increasing the grade values of plant nutrients by providing a suitable plant nutrient, mixing the plant nutrient with a colloidal micelle solution and, in a first embodiment with water. The mixture is subjected to a colloidal mill and is milled until it reaches a temperature of at least 65° F. and most preferably at least 120° F. As a first embodiment, the product of the milling operation is spray dried resulting in a powder having at least 95% solids. This powder can be applied to a suitable agricultural product taking advantage of the increase grade value of the nutrient either as a powder or by mixing the powder first with water.

Alternatively, as a second embodiment, the plant nutrient can be mixed solely with a colloidal micelle solution and milled without the addition of water. The resulting product, again, is milled until a temperature of at least 65° F. is reached and, preferably at least 120° F. The resulting product can be applied to an agricultural product systemically.

DETAILED DESCRIPTION OF THE INVENTION

Novel features which are characteristic of the invention, as to organization and method of operation, together with further objects and advantages thereof will be better understood from the following description in which preferred embodiments of the invention are illustrated by way of example. The various features of novelty which characterize the invention are recited with particularity in the claims.

There has been broadly outlined more important features of the invention in the summary above and in the detailed description which follows. There are, of course, additional features of the invention that will be described hereinafter and which lend support to the subject matter of the claims appended hereto. Those skilled in the art will appreciate that the conception upon which this disclosure is based readily may be utilized as a basis for the designing of other methods and systems for carrying out the several purposes of the present invention. It is important therefore, that claims be regarded as including such equivalent constructions insofar as they do not depart from the spirit and scope of the present invention.

The present invention involves a method of increasing the grade values of plant nutrients by providing a suitable plant nutrient, mixing the plant nutrient with a colloidal micelle solution and, in a first embodiment with water. The mixture is subjected to a colloidal mill and is milled until it reaches a temperature of at least 65° F. and most preferably at least 120° F. The product of the milling operation is spray dried resulting in a powder having at least 95% solids. This powder can be applied to a suitable agricultural product taking advantage of the increase grade value of the nutrient.

Alternatively, the plant nutrient can be mixed solely with a colloidal micelle solution and milled without the addition of water. The resulting product, again, is milled until a temperature of at least 65° F. is reached and, preferably at least 120° F. The resulting product can be mixed with water and applied to an agricultural product systemically.

As noted, the present invention involves the mixture of a plant nutrient with a micelle. A micelle is an aggregative surfactant molecule dispersed in a liquid colloid. A typical micelle in an aqueous solution forms an aggregate with a hydrophilic head region of the molecule in contact with the surrounding solvent sequestering the hydrophobic single-tail regions in the micelle center. This phase is caused by the insufficient packing of single-tail lipids in the bilayer. The difficulty filling all of the volume of the interior of the bilayer, while accommodating the area per head group forces on the molecule hydration of the lipid head group, leading to the formation of the micelle. This type of micelle is known as a colloidal or normal phase micelle (oil-in-water micelle). Inverse micelles have the head group at the center with the tails extending out (water-in-oil micelle). Micelles can take on various shapes including spheres, ellipsoids, cylinders and bilayers. The shape and size of a micelle is a function of the molecular geometry of its surfactant molecules and solution conditions such as surfactant concentration, temperature, pH and ionic strength.

The present invention uses commercially available micelles such as those available from InventeK Colloidal Cleaners of Mt. Laurel N.J., the SC1000 product of Gentek Products of Phoenix Ariz. and the Super-C product of National Colloid of Santa Ana Calif.

The products of the present invention are produced in two different ways depending upon whether a powder or liquid are intended as the end products. As a first embodiment, in producing the appropriate powder, a plant nutrient such a member selected from the group consisting of dicalcium phosphate vegetable protein, iron sulfate, zinc sulfate, copper sulfate, magnesium sulfate, soft rock phosphate, bat guano, sulfate of potash, oyster shell, herbivore insect frass and Acadian seaweed is selected. One would begin with approximately 15% to 78% by weight of the plant nutrient based upon the weight of the final composition which is mixed with approximately 0.5% to 3% by weight of a colloidal micelle solution and approximately 19% to 74.5% by weight of water forming a mixture. It has further been found that as a preferred embodiment, the nutrient can be included within the composition in an amount between approximately 40% to 70% by weight and, more ideally, between approximately 50% and 62% by weight. The micelle solution should be, as noted above, used in an amount between approximately 0.5% and 3% by weight and, more ideally, between approximately 1% and 2% by weight, the micelle being from 1 to 500 nm in size. Water, as noted above, is used between approximately 19% and 74.5% by weight but more ideally between approximately 28% and 59% by weight and most ideally between approximately 36% and 48% by weight. The mixture is subjected to a colloidal mill and the milling process undertaken until it reaches a temperature of at least approximately 65° F. and, most ideally, at least 120° F. and when milling is completed, the mixture is spray dried resulting in a powder having at least 95% solids. If the colloidal mill is operated under pressure, the temperature indicating completion of the milling process can be reduced. Pressures of up to 400 psi have been employed with success. The powder can be applied directly to the plant or mixed with water forming a suspension for application.

As a second embodiment, the present invention can produce a composition in the form of an aqueous suspension for application to a suitable plant. The method of producing such a composition involves beginning with a plant nutrient in an amount between approximately 15% and 70% by weight based upon the weight of the final composition and, more ideally, between approximately 40% and 68% by weight and most ideally between approximately 50% and 62% by weight. This plant nutrient is added to a colloidal micelle solution forming a mixture, the micelle having a particle size between 1 to 500 nm and subjecting the mixture to a colloidal mill again until a temperature of at least 65° F. is reached and, more ideally until the mixture reaches at least 120° F. The resulting composition has between 22% and 85% solids which can be added to water for application to a suitable plant. The micelle used in this embodiment is broadly in an amount between approximately 35% to 85% by weight, more preferably from approximately 32% to 60% by weight and most preferably 38% to 50% by weight. This composition can be added to water which would ideally also include, as an optional expedient, a preservative, generally, up to 10% by weight of the aqueous solution.

EXAMPLES

First Embodiment

A number of known plant nutrients were combined with National Colloid's Super-C micelle solution and water as noted in the following table.

TABLE 1

| Plant Nutrient | Percent Micelle Solution | Percent Water | Percent Plant Nutrient |
|---|---|---|---|
| Vegetable protein (Biodiversity Products, Inc. SN-14) | 3-5 | 30-35 | 60-68 |
| Dicalcium Phosphate (Gelita) | 3-5 | 45-48 | 50 |
| Iron Sulfate (Pencco 20% iron) | 3-5 | 45-47 | 50 |
| Zinc Sulfate (Titanium Minerals and Chemicals 23% Zn) | 3-5 | 45-47 | 50 |
| Copper Sulfate (Old Bridge Chemicals, Inc. 25% copper) | 3-5 | 45-47 | 50 |
| Magnesium Sulfate (Giles 9.8% Mg) | 3-5 | 45-47 | 50 |
| Soft Rock Phosphate (Westbridge 2% Phosphorous) | 3-5 | 45-47 | 50 |
| Nitrogen Bat Guano | 1-2 | 70-75 | 22-25 |

TABLE 1-continued

| Plant Nutrient | Percent Micelle Solution | Percent Water | Percent Plant Nutrient |
|---|---|---|---|
| (Aurora Inc.) | | | |
| Sulfate of Potash | 3-5 | 45-47 | 50 |
| (Diamond K. Gypsum, Inc.) | | | |
| Oyster Shell | 3-5 | 45-47 | 50 |
| (Jerico Products, Inc. Pacific Pearl) | | | |
| Herbivore Insect Frass | 1-2 | 71-74 | 25-27 |
| (Organic Nutrients) | | | |
| Seaweed | 3-5 | 58-60 | 36-38 |
| (Acadian Seaplants Ltd.) | | | |

In each instance, the mixtures were formed and initially mixed for fifteen minutes whereupon they were applied to a colloidal mill using ultra fine grind gears. Mixing took place until the composition exhibited a temperature of between 140° F. and 220° F. and, in each instance, testing was carried out at atmospheric pressure. Upon removal from the colloidal mill, the mixtures were spray dried raising their solids level from approximately 50% to approximately 95%. The following table exhibits the improved nutrient grade values as measured before and after the nutrients were subjected to the present invention.

TABLE 2

| Plant Nutrient | Grade Value Prior to Invention | Grade Value Subsequent to Invention |
|---|---|---|
| Vegetable protein (Biodiversity Products, Inc. SN-14) | 14-0-0 | 18.59-0-0 |
| Dicalcium Phosphate (Gelita) | 0-18-0, Calcium 22% (raw) | 0-43-0, Calcium 26% (suspension) |
| Iron Sulfate (Pencco 20% Iron) | 20% Iron (raw) | 27% Iron (suspension) |
| Zinc Sulfate (Titanium Minerals and Chemicals 23% Zn) | 23% Zinc (insoluble) | 33.54% Zinc (suspension) |
| Copper Sulfate (Old Bridge Chemicals, Inc. 25% copper) | 25% Copper (insoluble) | 27.10% Copper (suspension) |
| Magnesium Sulfate (Giles 9.8% Mg) | 9.8% Mg (partially soluble) | 10.17% Mg (suspension) |
| Soft Rock Phosphate (Westbridge 2% Phosphorous) | 2% Phosphorous (insoluble) | 10.85% Phosphorous (suspension) |
| Nitrogen Bat Guano (Aurora Inc.) | 9-3-1 (insoluble) | 9.95-5.57-1.82 (suspension) |
| Sulfate of Potash (Diamond K. Gypsum, Inc.) | 0-0-50 (insoluble) | 0-0-52.40 (suspension) |
| Oyster Shell (Jerico Products, Inc. Pacific Pearl) | 36% Calcium (insoluble) | 39.82% Calcium (suspension) |
| Herbivore Insect Frass (Organic Nutrients) | 2-2-2 (insoluble) | 3.25-4.71-2.67 (suspension) |
| Seaweed (Acadian Seaplants Ltd.) | 0.5-0-17 | 0.85-0-22.59 |

EXAMPLES

Second Embodiment

The process of the second embodiment was followed resulting in improvements in nutrient grade.

TABLE 3

| Plant Nutrient | % Nutrient | % Molecule Solution | Grade Value Prior to Invention | Grade Value Subsequent to Invention |
|---|---|---|---|---|
| Vegetable protein 14% raw nitrogen | 62 | 38 | 8.68% N | 12.46% N |
| Bone meal 18% raw phosphorus | 50 | 50 | 9% P | 21% P |
| Copper Sulfate 25% raw copper | 50 | 50 | 12% Cu | 15.97% Cu |
| Zinc Sulfate 23% raw zinc | 50 | 50 | 11.5% Zn | 20.31% Zn |
| Iron Sulfate 20% raw iron | 50 | 50 | 10% Fe | 13.48% Fe |
| Acadian Seaweed 0.5-0-17 raw | 50 | 50 | 0.25-0-8.5 | 0.425-0-11.27 |
| Soft Rock Phosphate 0-2-0 raw | 50 | 50 | 0-1-0 | 0-5-0 |

As the above tabulated data indicates, in the practice of the present invention, most plant nutrients will increase in grade value, and increase the nutrient's ability to be suspended in aqueous media. Purified versions of these nutrients release colloidal compounds into the soil that results in unlocking existing locked salts and remediating the soil structure.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A method of increasing grade value of a plant nutrient, said method comprising mixing a plant nutrient in an amount between approximately 15% to 78% by weight having a first grade value, with approximately 0.5 to 3% by weight based upon the weight a colloidal micelle solution and approximately 19% to 74.5% water by weight forming a mixture, said micelle having a particle size between approximately 1 to 500 nm, subjecting said mixture to a colloidal mill and milling said mixture until said mixture is of a temperature of at least approximately 65° F. and spray drying said mixture resulting in a powder having a grade value wherein the grade value of the powder is greater than the first grade value.

2. The method of claim 1 wherein said mixture is milled until said temperature is at least approximately 120° F.

3. The method of claim 1 wherein said mixture is milled under pressure up to approximately 400 psi.

4. The method of claim 1 wherein said powder after spray drying has at least approximately 95% solids.

5. The method of claim 1 wherein said plant nutrient is in an amount between approximately 40% to 70% by weight of said mixture.

6. The method of claim 1 wherein said water is in an amount between approximately 28% to 59% by weight of said mixture.

7. The method of claim 1 wherein said water is in an amount between approximately 36% to 48% by weight of said mixture.

8. A method of increasing grade value of a plant nutrient, said method comprising mixing a plant nutrient in an amount between approximately 15% to 78% by weight having a first grade value with approximately 0.5 to 3% of a colloidal micelle solution by weight and approximately 19% to 74.5% water by weight forming a mixture, said micelle having a particle size between approximately 1 to 500 nm, subjecting said mixture to a colloidal mill and milling said mixture above atmospheric pressure and spray drying said mixture resulting in a powder having a grade value wherein the grade value of the powder is greater than the first grade value.

9. The method of claim 8 wherein said powder after spray drying has at least approximately 95% solids.

\* \* \* \* \*